United States Patent
Grimaldo et al.

(10) Patent No.: US 10,532,639 B1
(45) Date of Patent: Jan. 14, 2020

(54) HOLDING ASSEMBLY FOR A SUNROOF RAIL SYSTEM

(71) Applicant: AISIN TECHNICAL CENTER OF AMERICA, INC., Northville, MI (US)

(72) Inventors: Jacob Grimaldo, Garden City, MI (US); Joel Runyan, Canton, MI (US); Chanli Ke, Novi, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 16/123,716

(22) Filed: Sep. 6, 2018

(51) Int. Cl.
*B60J 7/043* (2006.01)
*E05D 15/06* (2006.01)
*B60J 7/22* (2006.01)

(52) U.S. Cl.
CPC ............... *B60J 7/043* (2013.01); *B60J 7/22* (2013.01); *E05D 15/0621* (2013.01)

(58) Field of Classification Search
CPC ............ B60J 7/043; B60J 7/0435; B60J 7/22
USPC .................. 296/216.08, 216.03, 216.05, 217
See application file for complete search history.

(56) References Cited

U.S. PATENT DOCUMENTS

| | | | | |
|---|---|---|---|---|
| 6,550,853 B2* | 4/2003 | Wingen | .............. | B60J 7/024 296/216.03 |
| 6,799,796 B2* | 10/2004 | Radmanic | ............ | B60J 7/02 296/216.08 |
| 6,857,694 B2* | 2/2005 | Radmanic | ............ | B60J 7/02 296/216.08 |
| 6,877,799 B2* | 4/2005 | Seifert | .............. | B60J 7/0435 296/216.03 |
| 7,104,598 B2* | 9/2006 | Wingen | .............. | B60J 7/024 296/216.03 |
| 7,267,398 B2* | 9/2007 | Van De Logt | ....... | B60J 7/02 296/216.08 |
| 7,780,227 B2* | 8/2010 | Sawada | .............. | B60J 7/024 296/216.08 |
| 8,398,163 B2* | 3/2013 | Kikuchi | ............. | B60J 10/82 296/216.03 |
| 8,562,071 B2* | 10/2013 | Hirata | ................ | B60J 7/024 296/216.08 |

(Continued)

FOREIGN PATENT DOCUMENTS

| | | |
|---|---|---|
| CN | 206623663 U | 11/2017 |
| JP | 2012-106743 A | 6/2012 |

(Continued)

*Primary Examiner* — Dennis H Pedder
(74) *Attorney, Agent, or Firm* — Oblon, McClelland, Maier & Neustadt, L.L.P.

(57) ABSTRACT

A holding assembly in a vehicle sunroof includes: a housing; a sunroof panel; a rail extending in a front-rear direction of the sunroof, the sunroof panel being slideably connected to the rail; a rail guide extending in the front-rear direction and including a rail channel extending a length of the rail guide from a first end of the rail guide to a second end of the rail guide; and a front wall extending in the front-rear direction and including a support arm and a lateral restrictor, wherein the support arm extends towards the rail guide and below the rail channel at the second end of the rail guide, and the lateral restrictor has a planar shape parallel to the length of the rail guide, is attached to the support arm, and is in contact with an exterior face of the rail channel at the second end of the rail guide.

11 Claims, 11 Drawing Sheets

(56) References Cited

U.S. PATENT DOCUMENTS

| | | | |
|---|---|---|---|
| 8,807,639 B2 * | 8/2014 | Sawada | B60J 7/053 296/216.06 |
| 8,840,174 B2 * | 9/2014 | Nellen | B60J 7/02 296/216.08 |
| 8,876,201 B2 | 11/2014 | Katsura | |
| 8,960,782 B2 * | 2/2015 | Nellen | B60J 7/057 296/216.03 |
| 8,985,683 B2 * | 3/2015 | Kikuchi | B60J 7/0435 296/216.03 |
| 8,991,912 B2 * | 3/2015 | Nellen | B60J 7/057 296/223 |
| 9,290,085 B2 * | 3/2016 | Sawada | B60J 7/043 |
| 9,333,839 B2 * | 5/2016 | Manders | B60J 7/0435 |
| 9,550,410 B2 | 1/2017 | Katsura | |
| 9,579,958 B2 * | 2/2017 | Ide | B60J 7/0573 |
| 9,796,253 B2 | 10/2017 | Hattori | |
| 9,834,075 B2 * | 12/2017 | Heidan | B60J 7/0435 |
| 9,873,314 B1 | 1/2018 | Grimaldo et al. | |
| 10,300,774 B2 * | 5/2019 | Sommer | B60J 7/02 |
| 2002/0089216 A1 * | 7/2002 | Wingen | B60J 7/024 296/216.03 |
| 2002/0163228 A1 * | 11/2002 | Wingen | B60J 7/0435 296/223 |
| 2004/0032151 A1 * | 2/2004 | Radmanic | B60J 7/02 296/216.08 |
| 2005/0017547 A1 * | 1/2005 | Wingen | B60J 7/024 296/216.03 |
| 2006/0170254 A1 * | 8/2006 | Van De Logt | B60J 7/02 296/216.08 |
| 2012/0235448 A1 * | 9/2012 | Grimm | B60J 7/024 296/216.08 |
| 2014/0084637 A1 * | 3/2014 | Nellen | B60J 7/02 296/216.08 |
| 2014/0084638 A1 * | 3/2014 | Nellen | B60J 7/057 296/216.08 |
| 2015/0165878 A1 | 6/2015 | Kang | |
| 2015/0165882 A1 * | 6/2015 | Manders | B60J 7/0435 296/216.03 |
| 2018/0072143 A1 * | 3/2018 | Sommer | B60J 7/02 |

FOREIGN PATENT DOCUMENTS

| | | | |
|---|---|---|---|
| JP | 2017-128150 A | 7/2017 | |
| WO | WO-2007076781 A1 * | 7/2007 | B60J 7/024 |

* cited by examiner

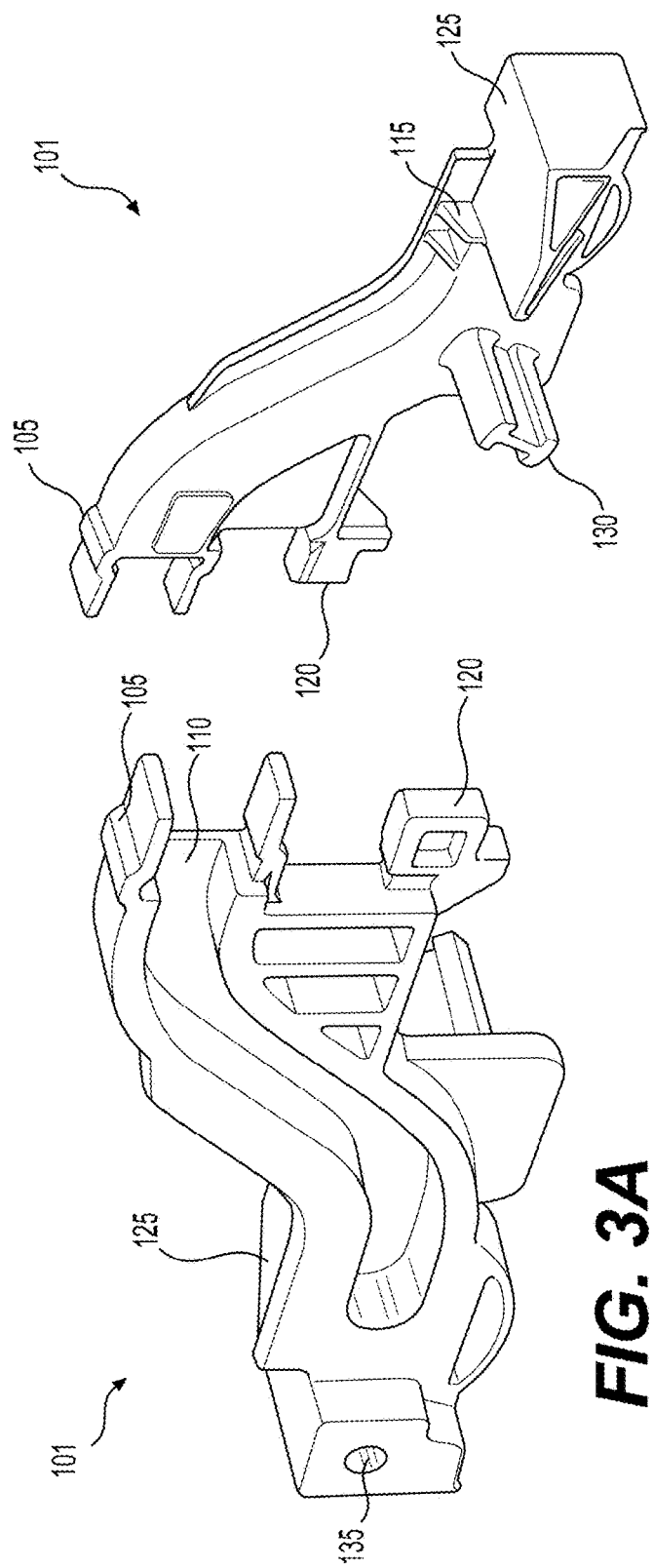
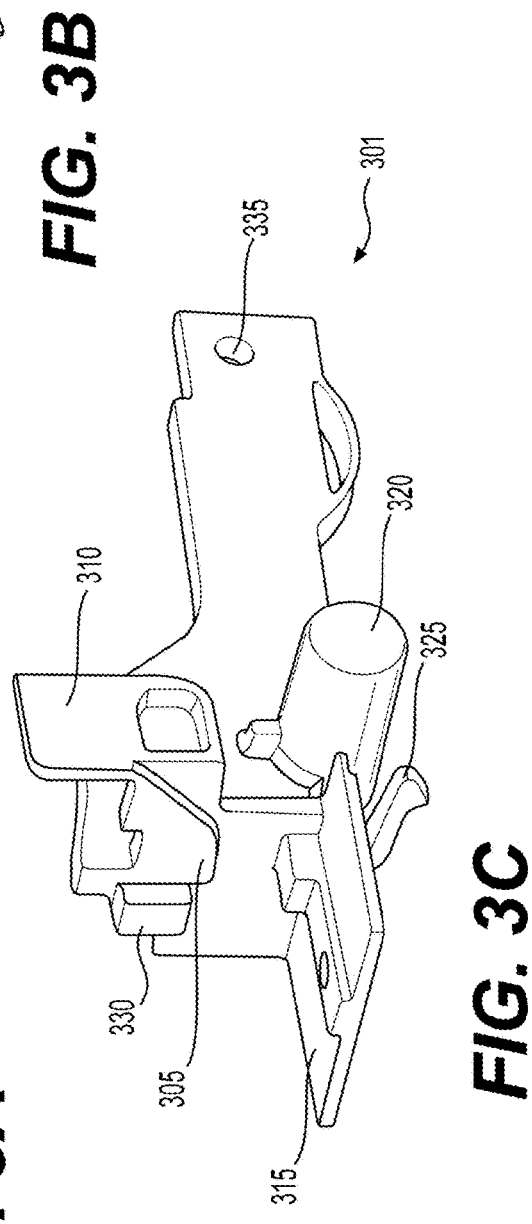
FIG. 3A
FIG. 3B
FIG. 3C

HOLDING ASSEMBLY FOR A SUNROOF RAIL SYSTEM

BACKGROUND

Field of the Disclosure

The present disclosure is directed towards a rail guide holding assembly for a vehicle sunroof.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Sunroof devices in vehicles may be complex and utilize many modular parts. To achieve an aesthetic appearance, function seamlessly, and meet safety regulations, the modular parts are designed to fit in a small packaging space in the vehicle's roof while being able to withstand large loads of force applied rapidly. This may occur during the event of a vehicle collision that experiences said forces from multiple directions, including a situation such as a rollover. Parts that secure the sunroof paneling to the rail system, such as the front guide where the panel rests when closed, may be more likely to experience said applied forces. Thus, additional holding features may be incorporated, such as an additional part, to secure the front guide to the sunroof housing while maintaining a small volumetric footprint via incorporating multiple holding mechanisms and movement restrictors onto a single part.

SUMMARY

The present disclosure relates to a holding assembly in a vehicle sunroof, including: a housing; a sunroof panel; a rail extending in a front-rear direction of the sunroof, the sunroof panel being slideably connected to the rail; a rail guide extending in the front-rear direction and including a rail channel extending a length of the rail guide from a first end of the rail guide adjacent to the housing to a second end of the rail guide adjacent to the rail, the rail channel being connected to the rail at the second end and receiving the slideably connected sunroof panel from the rail when the sunroof panel is moving to a closed position; and a front wall extending in the front-rear direction and including a support arm and a lateral restrictor, wherein the front wall is adjacent to the rail guide on an interior side of the rail guide, a first end of the front wall is aligned with the first end of the rail guide adjacent to the housing and a second end of the front wall is aligned with the second end of the rail guide adjacent to the rail, the support arm extends towards the rail guide and below the rail channel at the second end of the rail guide, the lateral restrictor has a planar shape parallel to the length of the rail guide, is attached to the support arm, and is in contact with an exterior face of the rail channel at the second end of the rail guide.

The assembly additionally includes: a spring support and a spring end clamp, wherein the spring support holds a coil of a spring, the spring end clamp secures an end of the spring, the spring support is on an exterior side of the front wall, and the spring end clamp is on an exterior side of the front wall.

The foregoing paragraphs have been provided by way of general introduction, and are not intended to limit the scope of the following claims. The described aspects, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A is a perspective view schematic of the rail guide, according to an exemplary aspect of the present disclosure;

FIG. 3B is a perspective view schematic of the rail guide, according to an exemplary aspect of the present disclosure;

FIG. 3C is a perspective view schematic of the front wall, according to an exemplary aspect of the present disclosure;

DETAILED DESCRIPTION

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Figure 1:
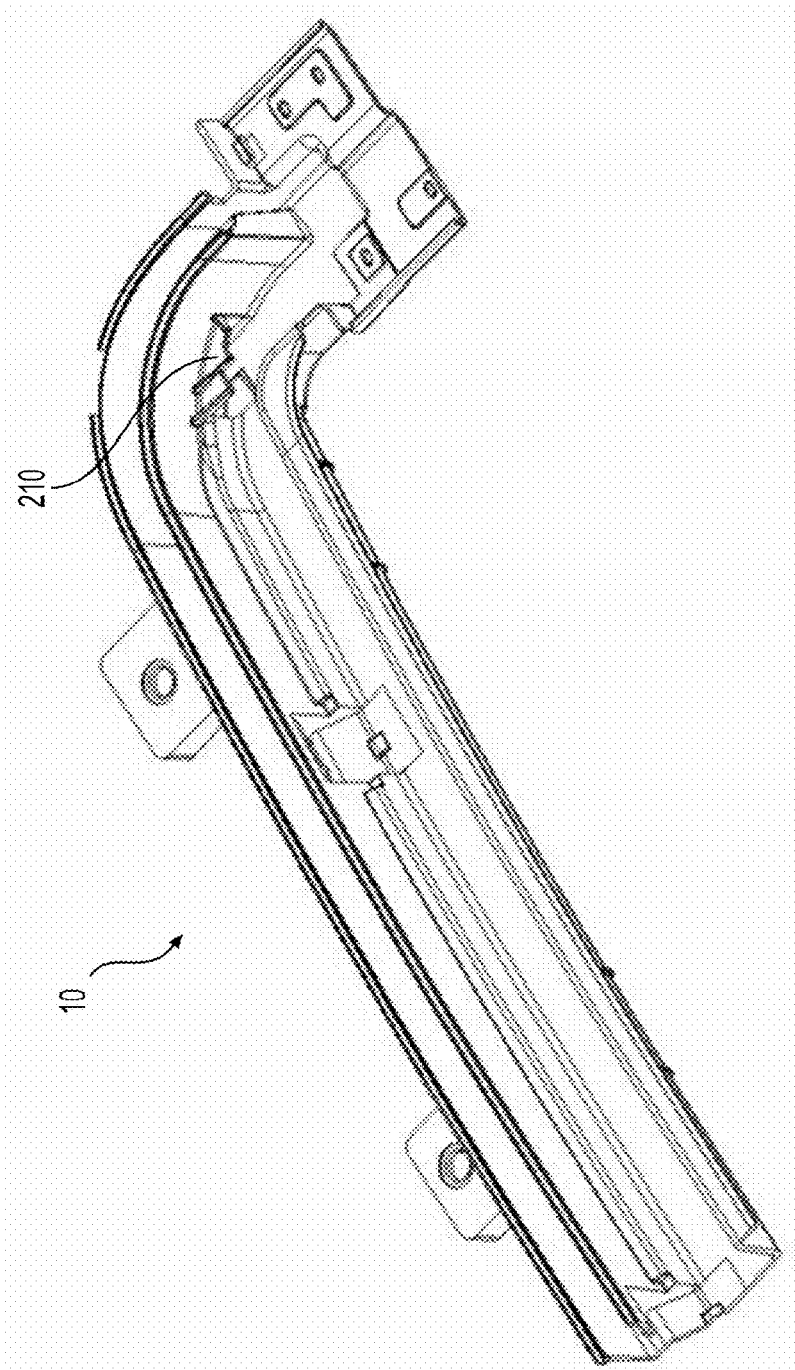
FIG. 1 is a perspective view schematic of a vehicle sunroof housing, according to an exemplary aspect of the present disclosure.
Figure 2A:
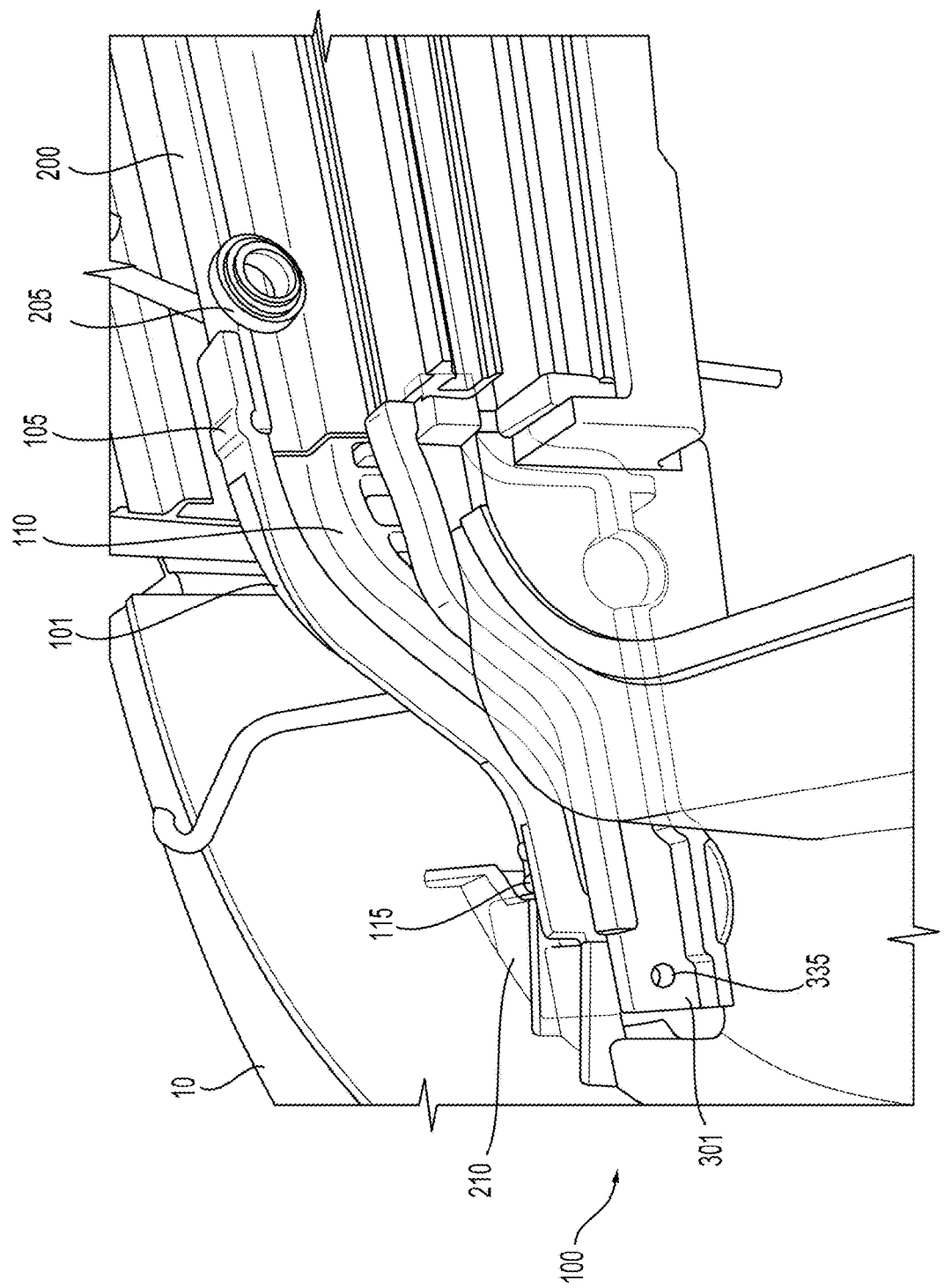
FIG. 2A is a perspective view schematic of the sunroof guide system, according to an exemplary aspect of the present disclosure.
Figure 2B:
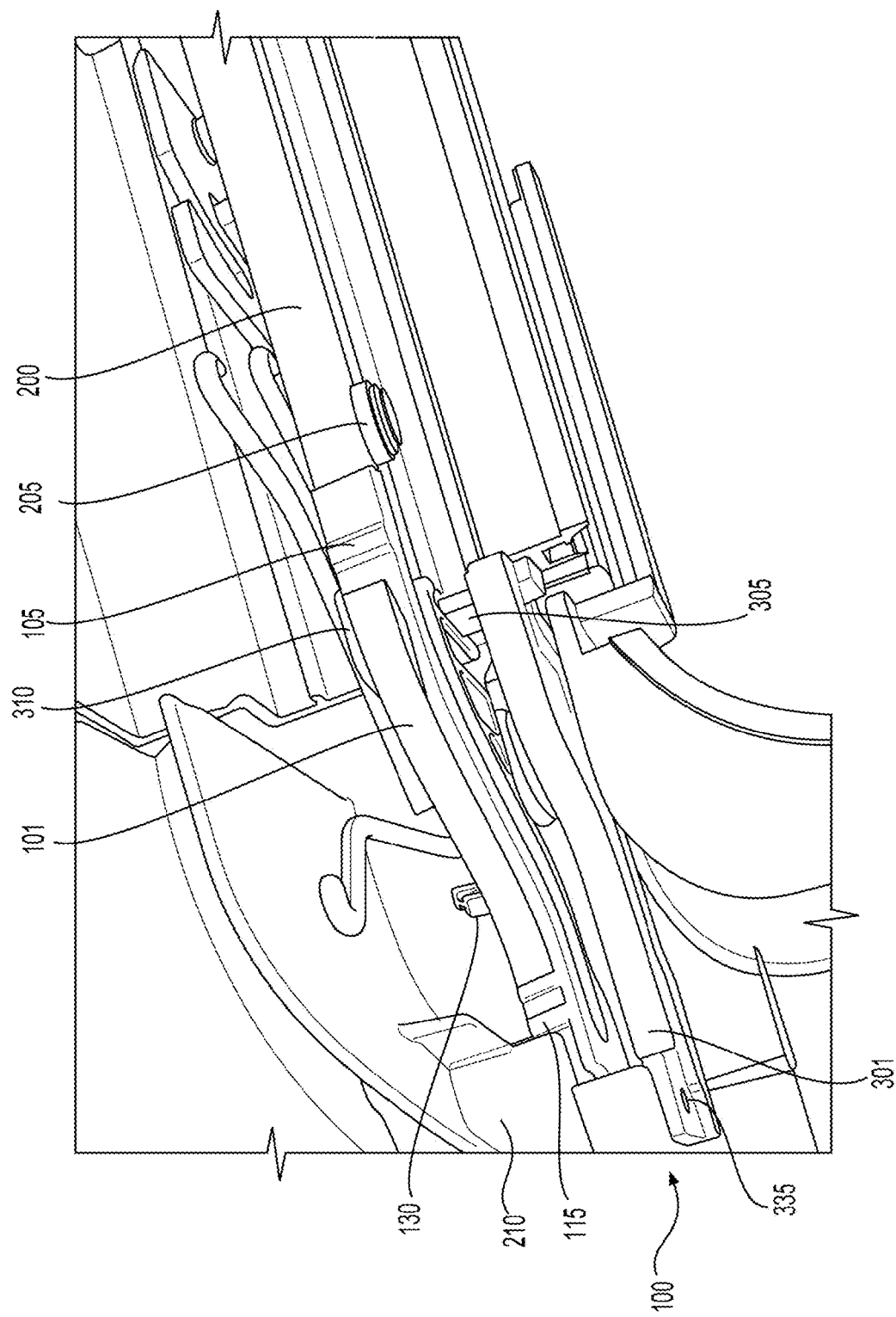
FIG. 2B is a perspective view schematic of the sunroof guide system, according to an exemplary aspect of the present disclosure.

FIGS. 1, 2A, and 2B illustrate a perspective view of a vehicle sunroof front housing 10 including a sunroof guide system 100, according to an exemplary aspect of the present disclosure. The sunroof guide system 100 may include a rail guide 101 and a front wall 301. The rail guide 101 may be attached to the sunroof front housing 10 via a sunroof panel rail 200 and a retaining housing feature 210. The front wall 301 may be mechanically or chemically attached to the sunroof front housing 10 and the rail guide 101, for example via at least one of, but not limited to, a bolt, screw, clip, clamp, nail, rivet, adhesive tape, and adhesive glue. The rail guide 101 may include a first end disposed adjacent to the retaining housing feature 210, and a second end disposed proximal to the sunroof panel rail 200. The rail guide 101 may have a ramped shape wherein the ramp plateaus at the first and second ends to couple with the retaining housing feature 210 and the sunroof panel rail 200, respectively. The retaining housing feature 210 may be a protrusion of material from the sunroof front housing 10 having a lower face oriented substantially horizontal, a first vertical face disposed along a rear edge of the retaining housing feature 210, wherein the rear edge is parallel to the front of the vehicle, and a second vertical face disposed along a front edge that is parallel to the front of the vehicle. The retaining housing feature 210 may be disposed in the corner of the sunroof front housing 10 and shaped to match the features (e.g. horizontal faces, vertical faces, etc.) at the first end of the rail guide 101 in order to more securely hold the rail guide 101.

FIGS. 3A and 3B illustrate a perspective view of the rail guide 101, according to an exemplary aspect of the present disclosure. The rail guide 101 may include a rail lock 105, a rail channel 110, at least one rail rib 115, a rail brace arm 120, a housing lock platform 125, a deflector lock 130, and a rail guide rivet hole 135. In one aspect, the sunroof front housing 10 may include a sunroof panel 205 (shown as a sliding feature in the sunroof panel rail 200) slideably coupled to the sunroof panel rail 200 and the rail channel 110. The sunroof panel 205 may be in an opened configuration such that the opening formed allows air to flow into the interior of the vehicle. The sunroof panel 205 may be in a closed configuration such that a seal is formed with the roof paneling and the sunroof panel 205 prevents foreign materials outside the vehicle from entering the vehicle. There may be multiple open configurations wherein the size of the opening in the sunroof varies according to a predetermined amount of air allowed into the vehicle at each configuration. The sunroof panel 205 may be opened and closed via sliding the sunroof panel 205 along the sunroof panel rail 200. The inclined shape of the rail channel 110 may elevate the sunroof panel 205 and allow it to slide above the roof of the vehicle when transitioning to the open configuration and back down to match the body paneling of the roof when transitioning to the closed configuration.

The rail guide 101 may be attached to the sunroof panel rail 200 and secured via the rail lock 105 and rail brace arm 120, wherein the rail lock 105 may include a notched feature to mate with a first complementary feature of the sunroof panel rail 200. The rail brace arm 120 may align with a second complementary feature of the sunroof panel rail 200 and help guide the sunroof panel rail 200 into a predetermined position adjacent to the rail guide 101 during installation. The sunroof panel rail 200 and rail channel 110 may have a shape with a cross section resembling an open rectangle, wherein two opposite sides are parallel to one another and connected via a third side that is perpendicular to both of the two opposite sides. This open rectangular shape may run the length of the sunroof panel rail 200 and the rail channel 110, wherein the opening of the rectangular shape faces the interior of the sunroof and may receive the sunroof panel 205. In transitioning from the open to closed configuration, the sunroof panel 205 may slide along the sunroof panel rail 200 towards the rail channel 110 of the rail guide 101. The sunroof panel 205 may slide along the rail channel 110 and down the ramped shape and come to a stop at the first end of the rail guide 101. Via this motion, the sunroof panel 205 may lower into the sunroof front housing 10 where it is substantially flush with the rest of the vehicle roof body paneling.

Figure 4B:
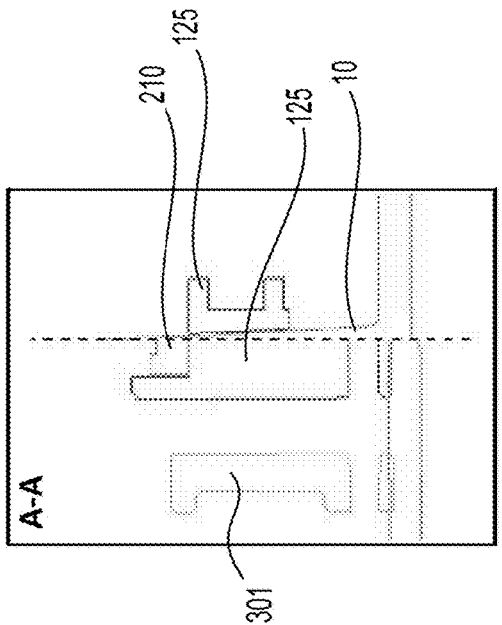
FIG. 4B is a cross-sectional view schematic of the A-A cross-sectional line drawn in FIG. 4A, according to an exemplary aspect of the present disclosure.
Figure 4C:
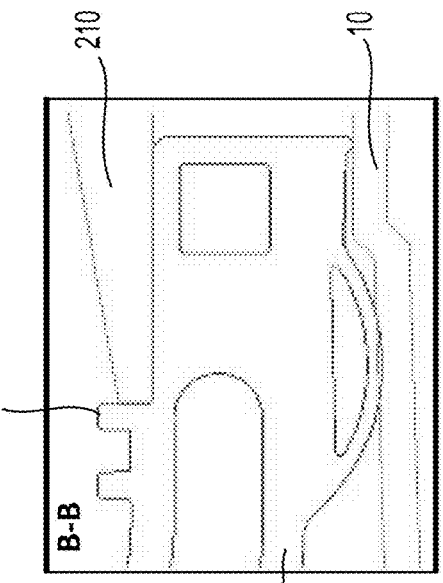
FIG. 4C is a cross-sectional view schematic of the B-B cross-sectional line drawn in FIG. 4A, according to an exemplary aspect of the present disclosure.
Figure 4A:
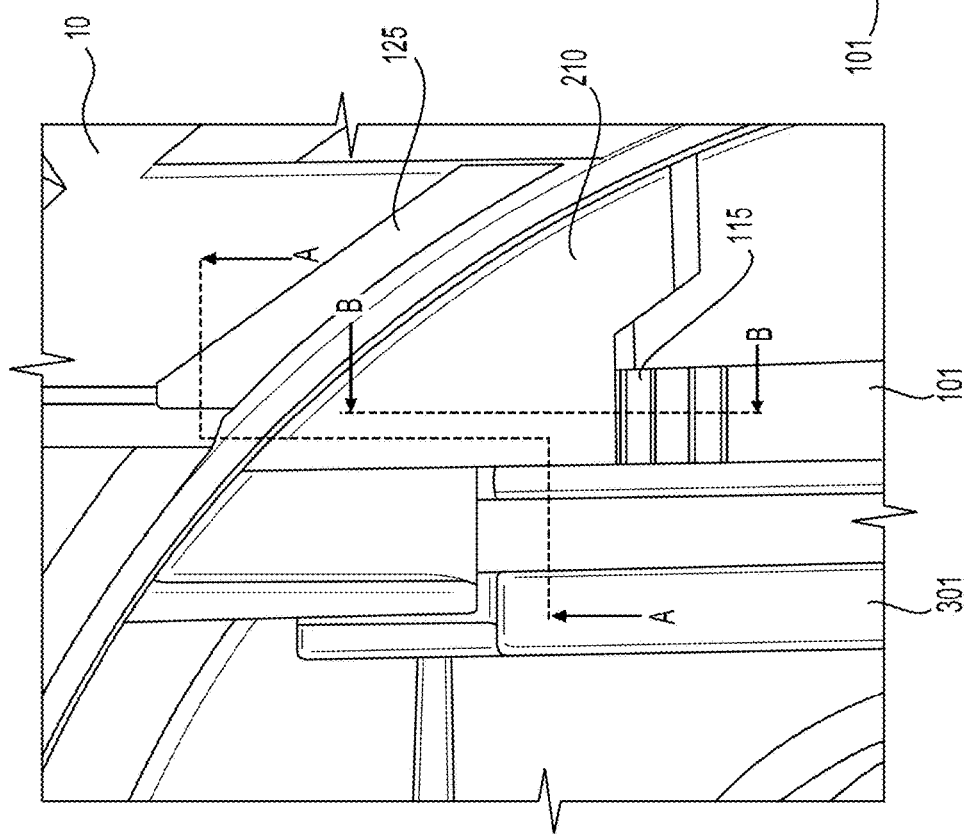
FIG. 4A is a top-down view schematic of the sunroof guide system, according to an exemplary aspect of the present disclosure.

FIG. 4A illustrates a top-down view of the rail guide 101 nestled under the retaining housing feature 210 with lines drawn that correspond to cross-sectional views, and FIGS. 4B and 4C illustrate said cross-section views of the rail guide 101, according to an exemplary aspect of the present disclosure. In the closed configuration, the rail guide 101 may provide a means of holding the sunroof panel securely during events where the vehicle undergoes high impact, such as a collision or rollover. The rail 101 guide may include the at least one rail rib 115 at the first end. The cross-sectional shape of the at least one rail rib 115 can be, but is not limited to, a wedge shape (as shown), rectangular, and curved (e.g. a quadrant of a circle or ellipse). The at least one rail rib 115 may be oriented such that a face of the at least one rail rib 115 is perpendicular to the direction of the rail channel 110. The face of the at least one rail rib 115 may abut an edge of the retaining housing feature 210, as seen in FIG. 4C. In abutting the retaining housing feature 210, the at least one rail rib 115 may prevent the rail guide 101, and the sunroof panel 205 slideably attached to it, from sliding further forward into the sunroof front housing 10 during, for example, a frontal vehicle collision, which could cause damage to the sunroof front housing 10 or cause the rail guide 101 to structurally fail and the sunroof panel 205 could be ejected from the sunroof guide system 100.

Figure 5B:
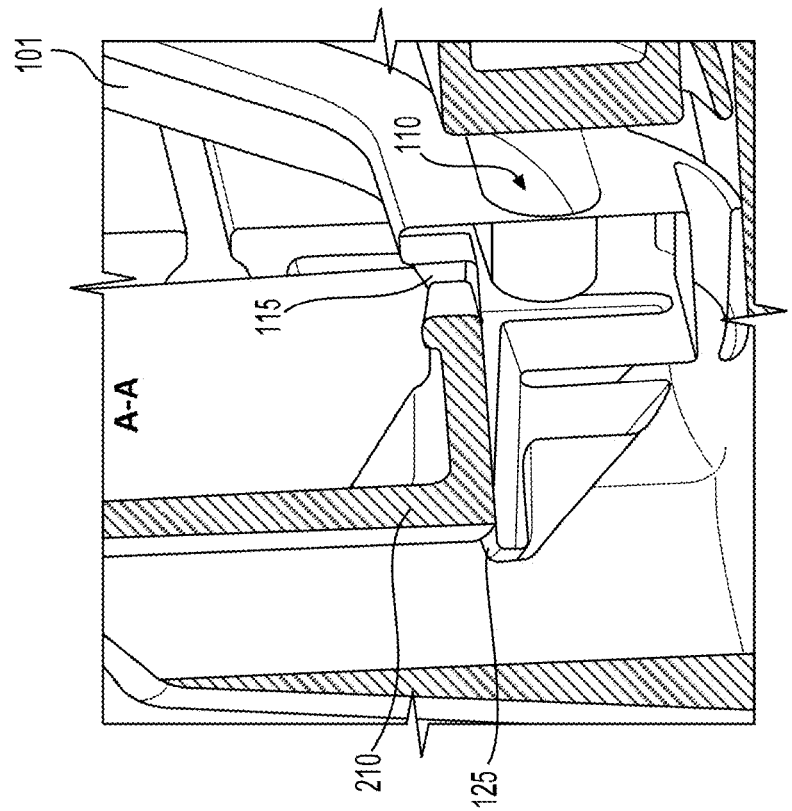
FIG. 5B is a cross-sectional view schematic of the A-A cross-sectional line drawn in FIG. 5A, according to an exemplary aspect of the present disclosure.
Figure 5A:
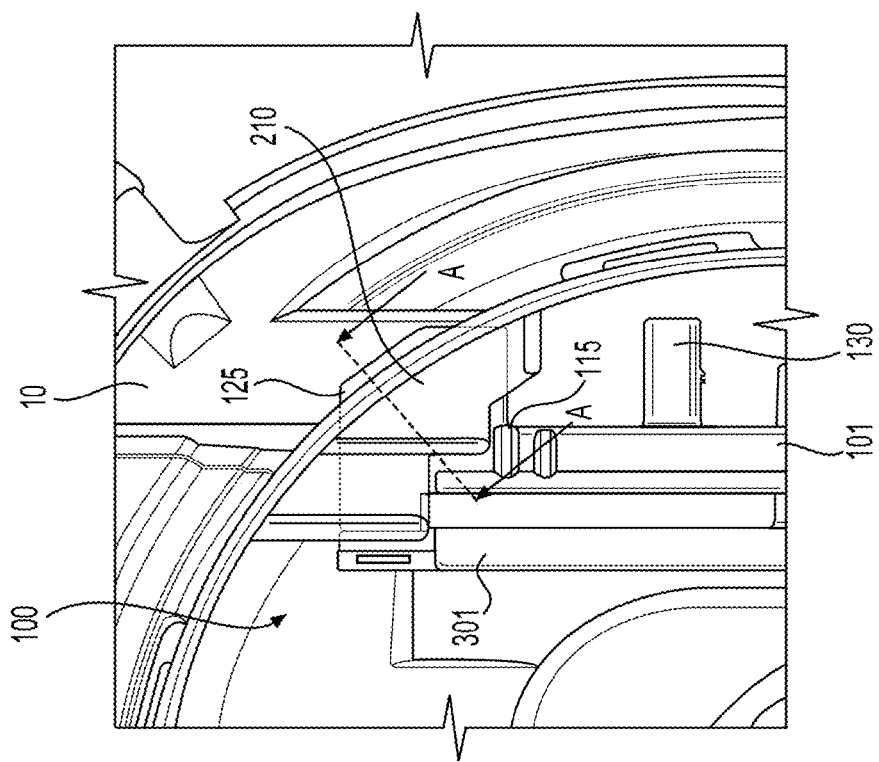
FIG. 5A is a top-down view schematic of the sunroof guide system, according to an exemplary aspect of the present disclosure.

FIG. 5A illustrates a top-down view of the rail guide 101 with a line drawn that corresponds to a cross-sectional view and FIG. 5B illustrates said cross-section views of the rail guide 101, according to an exemplary aspect of the present disclosure. Referring again to FIG. 3B, the housing lock platform 125 may be at the first end and include a front face and an upper face. The front and upper face of the housing lock platform 125 may be shaped to match a complementary shape of the retaining housing feature 210 in order to increase the amount of surface area of the faces that is in contact with the retaining housing feature 210. For example, as illustrated in FIGS. 3B and 5A, the shape of the front face may be substantially rectangular and the shape of the upper face may be rectangular with a slanted or curved corner to follow the curvature of the sunroof front housing 10. The housing lock platform 125 may slide under the retaining housing feature 210 prior to being attached via mechanical or chemical means. As illustrated in FIG. 5B, the upper face of the housing lock platform 125 may come into contact with a lower face of the retaining housing feature 210 (as shown) or an air gap may be present between the two faces. The two faces may move slideably past each other until the front face of the housing lock platform 125 or the at least one rail rib 115, or both, come into contact with the sunroof front housing 10 or the rear edge of the of the retaining housing feature 210, respectively. The front face of the housing lock platform 125 adjacent to the sunroof front housing 10 may abut the sunroof front housing 10 to prevent forward motion of the rail guide 101. Thus, the at least one rail rib 115 may work cooperatively with the front face of the housing lock platform 125 to distribute the forces felt by the rail guide 101 during a frontal collision. In the event of a vehicle rollover, the nesting of the housing lock platform 125 under the retaining housing feature 210 allows the upper surface of the housing lock platform 125 to brace against the lower face of the retaining housing feature 210 in order to prevent the rail guide 101 from moving outwards in a direction away from the roof of the vehicle due to the centripetal force exerted on the exterior of the vehicle. The surface area of the upper surface of the housing lock platform 125 in contact with the lower face of the retaining housing feature 210 may be designed to be a predetermined area to increase distribution of forces exerted during a rollover. The predetermined area may be determined based on calculations of forces exerted on the vehicle during a rollover and the force required to withstand structural failure of the housing lock platform 125 when braced against the retaining housing feature 210.

Figure 6B:
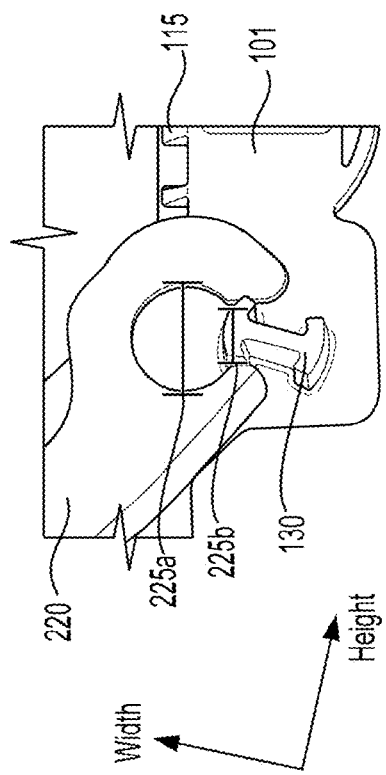
FIG. 6B is a side view schematic of the deflector lock with the deflector arm, according to an exemplary aspect of the present disclosure.
Figure 6C:
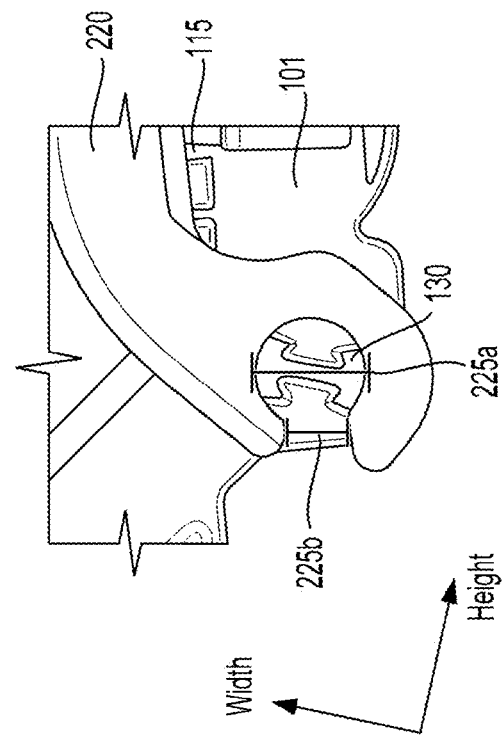
FIG. 6C is a side view schematic of the deflector lock with the deflector arm rotated to lock, according to an exemplary aspect of the present disclosure.
Figure 6A:
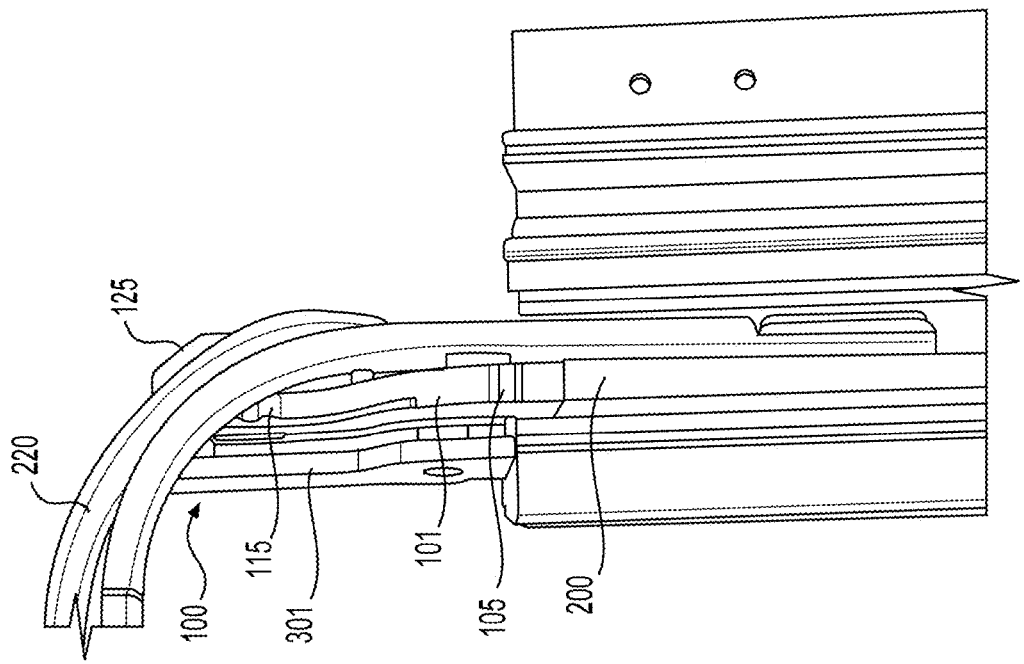
FIG. 6A is a top-down view schematic of the sunroof guide system including a deflector arm, according to an exemplary aspect of the present disclosure.

FIG. 6A illustrates a top-down view of the sunroof front housing 10 including a deflector arm 220, according to an exemplary aspect of the present disclosure. The deflector arm 220 may support a sunroof deflector system (not shown) configured to reduce wind noise and turbulent air flow from entering into the sunroof opening of the vehicle. The deflector arm 220 may be attached to the rail guide 101 and rotateably locked on the deflector lock 130. FIGS. 6B and 6C illustrate a side-view of the deflector arm 220 being attached to the rail guide 101 and being rotated on the deflector lock 130 to lock the deflector arm 220 without an additional mechanical or chemical attachment means. The deflector lock 130 may be disposed on a side of the rail guide 101. The shape of the deflector lock 130 may be designed such that exterior of the shape substantially follows the curvature of a circle, wherein two outer segments of the circle are removed. The remaining middle segment of the circle may be the middle third of a circle. Said middle segment of the circle may have a width that is larger than a height of the segment. For example, the shape may be the middle third of a circle having a width that is larger than a height of the segment in addition to the middle connection between the curved edges being a thinned piece of material to form an H-shape (as shown).

The deflector arm 220 may include a locking feature having a first locking feature opening 225a being substantially circular and a second locking feature opening 225b being a contiguous opening with the first locking feature opening 225a and configured to receive the deflector lock 130. The width of the second locking feature opening 225b may be slightly wider than the height of the deflector lock 130 (relative to when the deflector lock 130 is viewed as the H-shape) such that the deflector arm 220 may slide onto the deflector lock 130 in a direction perpendicular to the height of the deflector lock 130, i.e. along the width.

The width of the first locking feature opening 225a may be wider than the width of the deflector lock 130 (width of the H-shape) such that when the deflector arm 220 slides onto the deflector lock 130 fully, i.e. when the deflector lock 130 is disposed in the middle of the first locking feature opening 225a, the deflector arm 220 may be rotated which rotates the locking feature around the deflector lock 130. The deflector arm 220 may be rotated until the second locking feature opening 225b is aligned with the height of the H-shape of the deflector lock 130 (FIG. 6C) wherein the width of the H-shape of the deflector lock 130 is wider than the second locking feature opening 225b and prevents the deflector arm 220 and deflector arm locking feature from sliding off the deflector lock 130. Notably, securing the deflector arm 220 utilizes a rotation motion and does not require additional mechanical or chemical means of attachment to the rail guide 101. It can be appreciated that alternative shapes for the deflector lock 130 may be used that includes a circular exterior to allow the rotational locking motion.

FIG. 3C illustrates a perspective view of the front wall 301, according to an exemplary aspect of the present disclosure. The front wall 301 may include a first end disposed adjacent to the sunroof front housing 10, and a second end disposed adjacent to the sunroof panel rail 200. The front wall 301 may have a ramped shape wherein the ramp plateaus at the first and second ends.

Figure 7B:
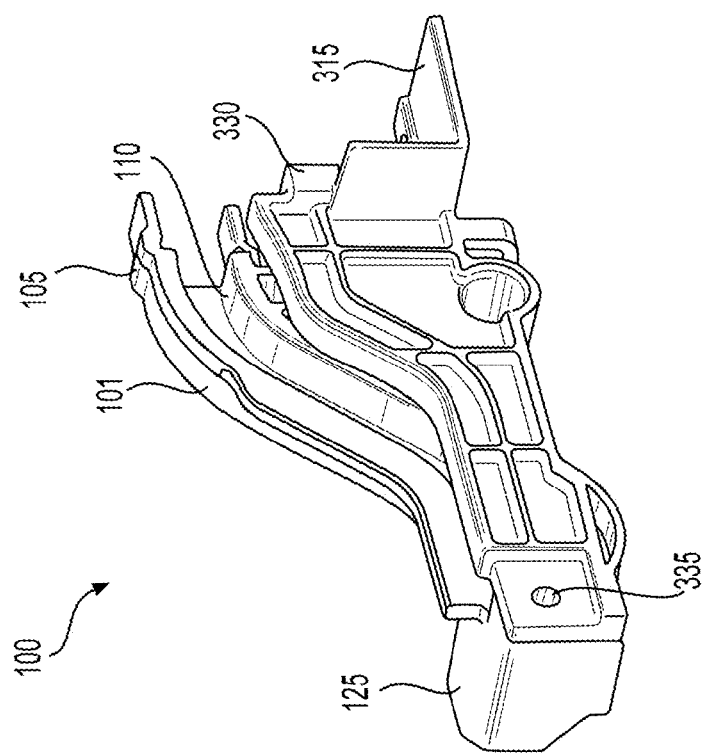
FIG. 7B is a perspective view schematic of the rail guide coupled to the front wall, according to an exemplary aspect of the present disclosure.
Figure 7A:
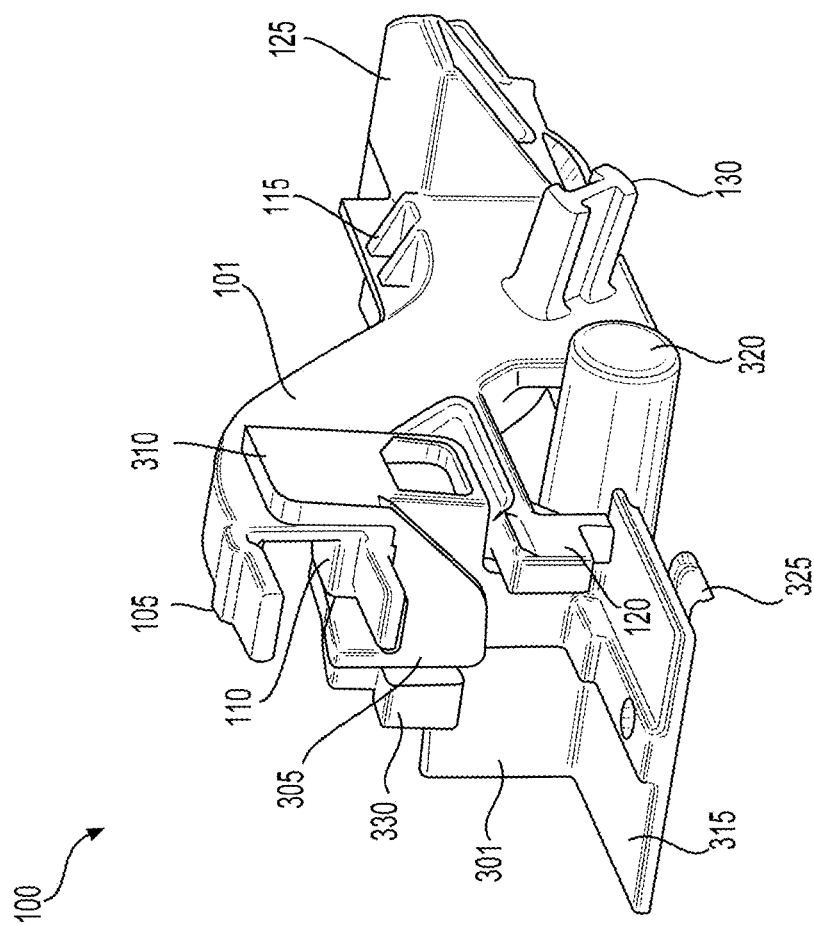
FIG. 7A is a perspective view schematic of the rail guide coupled to the front wall, according to an exemplary aspect of the present disclosure.

FIGS. 7A and 7B illustrate perspective views of the front wall 301 coupled to the rail guide 101, according to an exemplary aspect of the present disclosure. The front wall 301 may include a support arm 305, a lateral restrictor 310, a rail support platform 315, a spring support 320, a spring end clamp 325, a rail aligner 330, a front wall rivet hole 335, and a spring 340.

The front wall 301 may be inserted into a position proximal to the rail guide 101 such that the first end of both the front wall 301 and rail guide 101 are adjacent to each other and second end of both the front wall 301 and the rail guide 101 are adjacent to each other. The rail guide rivet hole 135 and front wall rivet hole 335 may be substantially aligned with each other such that a mechanical means of attaching the two pieces to each other may pass through both features. For example, a rivet may pass through both rivet holes 135, 335 and secure the front wall 301 to the rail guide 101. In turn, the rivet may be secured to the sunroof front housing 10 in order to secure both first ends to the sunroof front housing 10. In inserting the front wall 301 into the sunroof front housing 10, the front wall 301 may be disposed on a side of the rail guide 101 facing the interior of the sunroof.

Figure 8B:
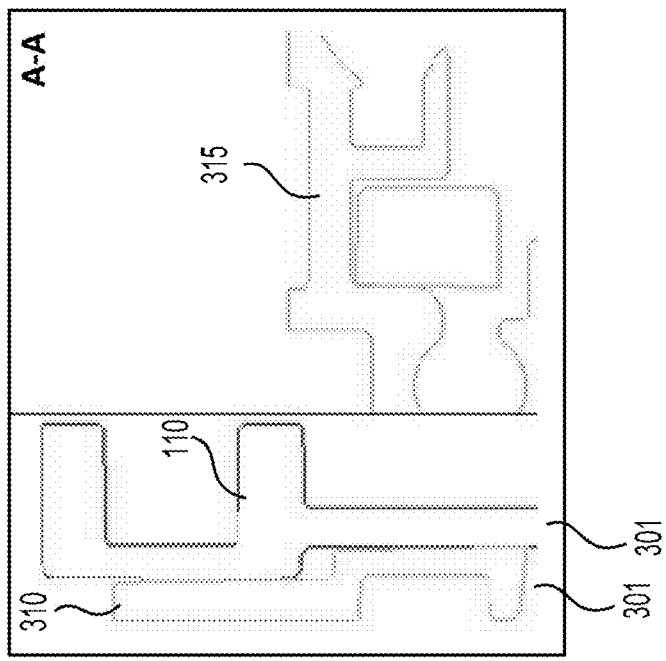
FIG. 8B is a cross-sectional view schematic of the A-A cross-sectional line drawn in FIG. 8A, according to an exemplary aspect of the present disclosure.
Figure 8A:
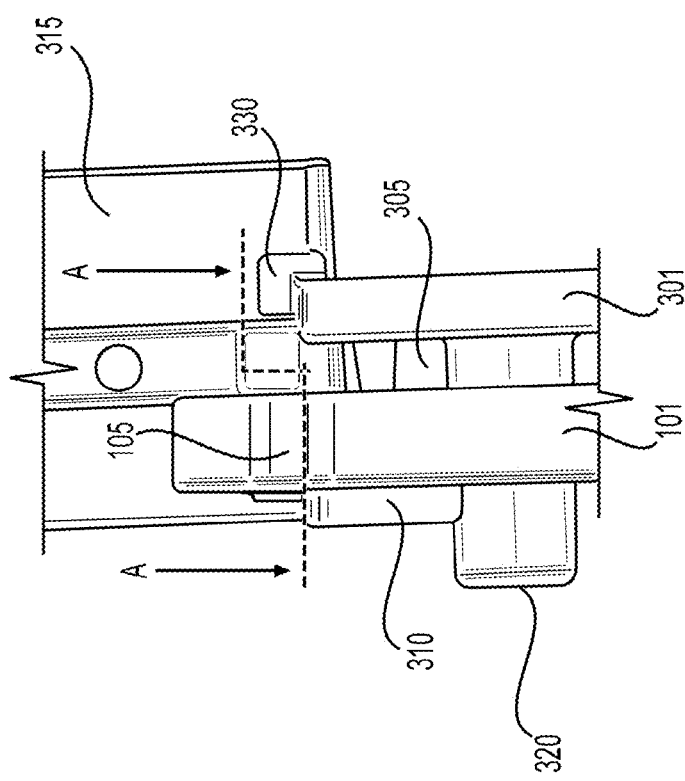
FIG. 8A is a top-down view schematic of the sunroof guide system, according to an exemplary aspect of the present disclosure.

FIG. 8A illustrates a top-down view of the front wall 301 coupled to the rail guide 101 with a cross-sectional line drawn, and FIG. 8B illustrates said cross-sectional view, according to an exemplary aspect of the present disclosure. The support arm 305 and the lateral restrictor 310 may be a piece of substantially laterally-oriented material at the second end of the front wall 301. The lateral restrictor 310 may be a substantially planar piece of material attached to the support arm 305 and substantially vertically oriented, wherein the plane of the lateral restrictor 310 runs along the front-to-rear direction. The support arm 305 may slide under the rail channel 110 at the second end of the rail guide 101 and the lateral restrictor 310 may slide into a position adjacent to an exterior face of the rail channel 110. The support arm 305 may be configured to support the rail channel 110 as the sunroof panel 205 applies downward force from sliding between the sunroof panel rail 200 to the rail channel 110 and vice versa. Additional moments of increased downward force may occur when the vehicle traverses a bump or pothole, and the support arm 305 may be configured to resist the additional increase in downward force. The support arm 305 may brace against the portion of material on the rail guide 101 between the rail channel 110 and the rail brace arm 120 in order to prevent rearward movement of the rail guide 101. The lateral restrictor 310 may prevent movement of the rail channel 110 in a direction away from the front wall 301, e.g. towards the exterior of the sunroof, which may occur during vehicle turns.

The front wall 301 is disposed on a side of the rail guide 101 facing the interior of the sunroof and braced against the sunroof front housing 10 facing the interior. Thus, the rail guide 101 may be prevented from lateral movement towards the interior of the sunroof via the main body of the front wall 301, which may also occur during vehicle turns.

The rail support platform 315 may include an upper face and a front face. The upper face of the rail support platform 310 may support the sunroof panel rail 200, and the front face of the rail support platform 310 may abut a front face of the sunroof panel rail 200. The front face may cooperate with the rail aligner 330, rail brace arm 120, rail guide 110, support arm 305, or any combination thereof, to prevent forward movement of the sunroof panel rail 200 and distribute the force applied over a large surface area. The rail support platform 315 may be attached to the sunroof front housing 10 via aforementioned means, e.g. a rivet, screw, bolt, adhesive glue, etc.

The rail aligner 330 may line up with a third complementary feature of the sunroof panel rail 200 and help guide the sunroof panel rail 200 into the correct position adjacent to the front wall 301 during installation.

Figure 9:
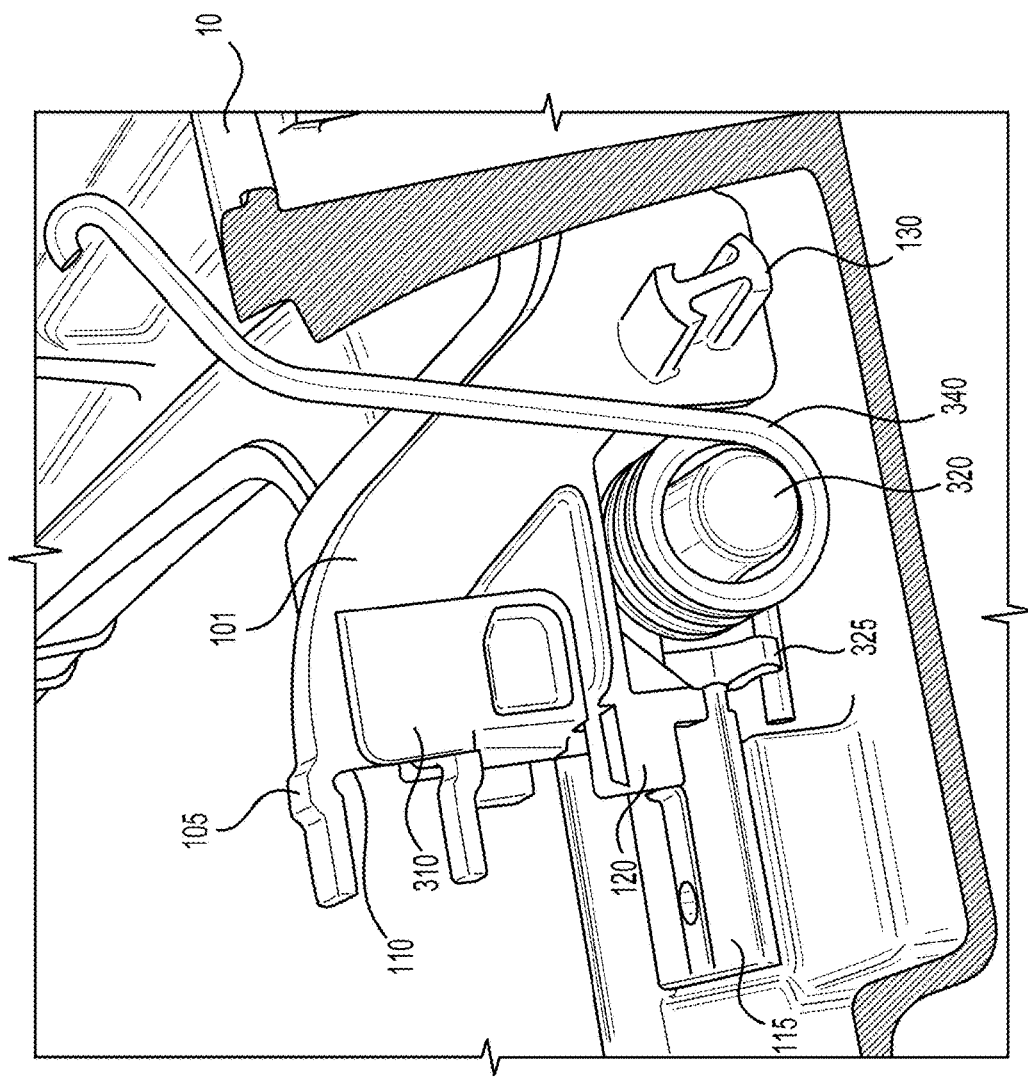
FIG. 9 is a perspective view schematic of the spring holder of the front wall, according to an exemplary aspect of the present disclosure.
Figure 10A:
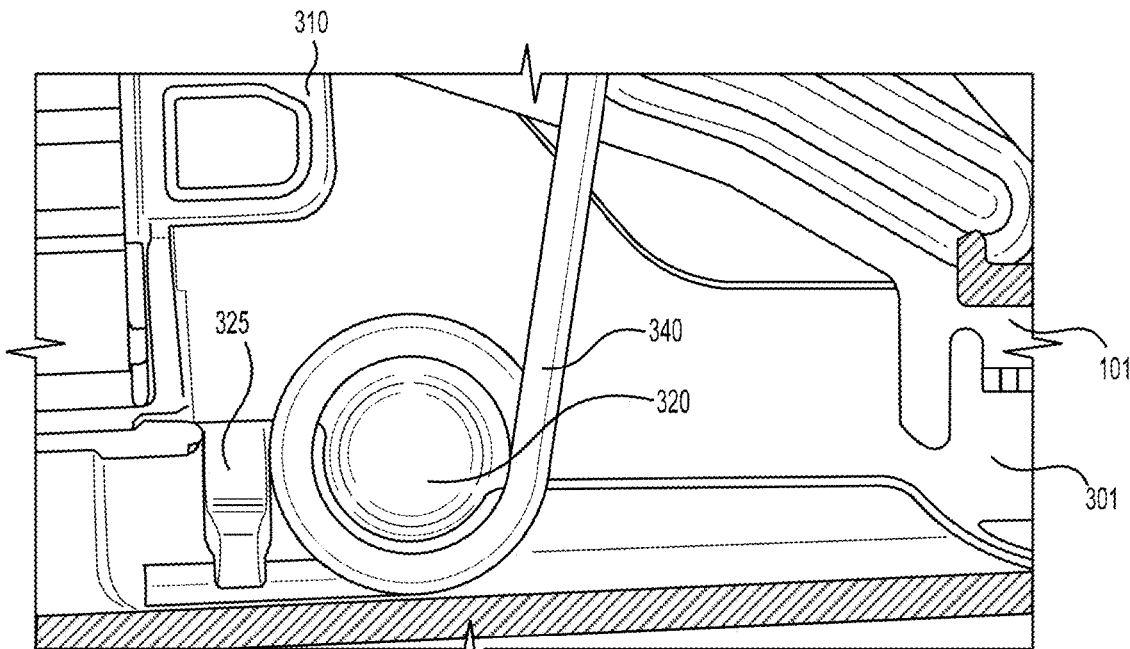
FIG. 10A is a side view schematic of the spring holder of the front wall, according to an exemplary aspect of the present disclosure.
Figure 10B:
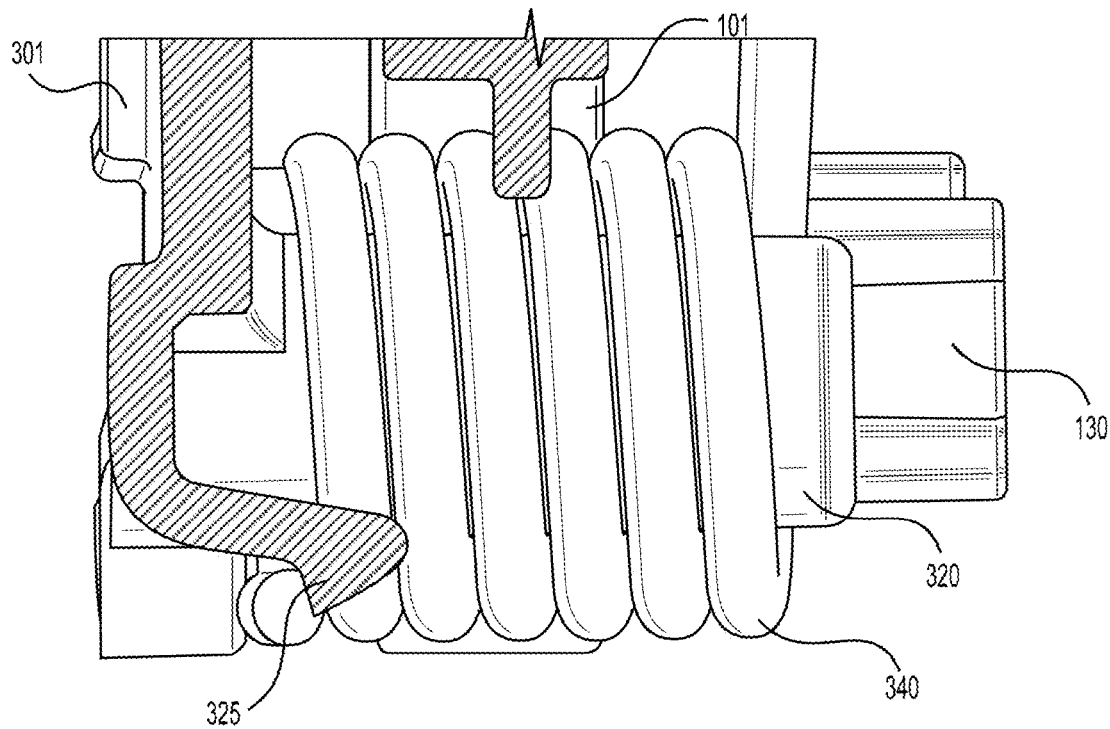
FIG. 10B is a front view schematic of the spring holder of the front wall, according to an exemplary aspect of the present disclosure.

FIG. 9 illustrates a perspective view of the spring support 320, and FIGS. 10A and 10B illustrate front and side views of the spring support 320, respectively, according to an exemplary aspect of the present disclosure. The rail brace arm 120 may slide over the spring support 320 during insertion of the front wall 301 into the sunroof front housing 10. The spring support 320 may be substantially cylindrically shaped and configured to hold the spring 340. The spring support 320 may be disposed on the side facing the exterior of the sunroof, under the rail channel 110 in the dead space of the rail guide 101 ramp shape when the rail guide 101 and front wall 301 are coupled together. In this orientation, the spring support 320 is on the same side as the deflector lock 130 and efficiently utilizes the limited available space in the sunroof front housing 10.

The spring end clamp 325 may be adjacent to the spring support 320 and shaped like an elongated arm with a hook. The spring end clamp 325 may be elongated in a direction substantially parallel to the spring support 320 and configured to secure an end of the spring 340 against the sunroof front housing 10 and the body of the front wall 301. The hook of the spring end clamp 325 may be a wedge shape such that the end of the spring 340 may slide towards the spring end clamp 325 and deflect the arm and hook shape upwards, and upon moving past the hook, allow the hook to return to its original position and clamp down on the end of the spring 340. In this position, the hook of the spring end clamp 325 provides more resistance against the movement of the end of the spring 340 away from the hook compared to the movement towards the hook. The spring end clamp 325 may prevent movement of the end of the spring 340 in substantially all four directions (towards the left, right, top, and bottom of the vehicle).

The advantages of the rail guide 101 are summarized as follows: the rail lock 105 and rail brace arm 120 align the sunroof panel rail 200 to the rail guide 101 during installation and secure the sunroof panel rail 200 to the rail guide 101; the at least one rail rib 115 abuts with the first complementary feature of the retaining housing feature 210 to prevent forward movement of the rail guide 101; the housing lock platform 125 slides under the retaining housing feature 210 and the upper face of the housing lock platform 125 abuts the lower face of the retaining housing feature 210 during moments of outwardly-oriented applied forces (e.g. a vehicle rollover) to increase the distribution of said forces over a large surface area; the front face of the housing lock platform 125 also abuts the sunroof front housing 10 to prevent forward movement of the rail guide 101; the deflector lock 130 can secure the deflector arm 220 of the sunroof panel via a rotational motion without the need for an additional applied mechanical or chemical attachment means (and thusly can be removed with said rotational motion in the opposite direction without the need for removing any additional attachment means); and the rail guide 101 is fabricated separately of the sunroof panel rail 200 and the aforementioned features are aligned to the rail guide 101 as opposed to being fabricated simultaneously with the sunroof panel rail 200.

The advantages of the front wall 301 are summarized as follows: the support arm 305 and lateral restrictor 310 support the rail channel 110 as well as prevent motion away from the front wall 301, i.e. towards the exterior of the sunroof; the front face of the rail support platform 315 and the rail aligner 330 abut with the sunroof panel rail 200 to prevent forward movement of the rail guide 101; the upper face of the rail support platform 315 may be secured to the sunroof front housing 10 and supports the sunroof panel rail 200; the spring support 320 holds the spring 340 in a dead space of the rail guide 101 and is large enough to hold a spring of a predetermined size; the spring end clamp 325 secures an end of the spring 340 and prevents motion of the end in four directions.

When coupled, the rail guide 101 and front wall 301 may be riveted together and secured to the sunroof front housing 10 to further increase structural rigidity of the sunroof guide system 100. The rail guide 101 prevents motion of the front wall 301 towards the exterior of the sunroof panel via bracing against an exterior part of the sunroof front housing 10, and the front wall 301 prevents motion of the rail guide 101 towards the interior of the sunroof panel via bracing against an interior part of the sunroof front housing 10. Together, the sunroof guide system 100 may align and secure the sunroof panel rail 200 during installation, normal vehicle operation (e.g. opening or closing of the sunroof), or high-impact vehicle events such as collisions or rollovers, or any combination thereof.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A holding assembly in a vehicle sunroof, comprising:
a housing;
a sunroof panel;
a rail extending in a front-rear direction of the sunroof, the sunroof panel being slideably connected to the rail;
a rail guide extending in the front-rear direction and including a rail channel extending a length of the rail guide from a first end of the rail guide adjacent to a front portion of the housing to a second end of the rail guide adjacent to the rail, the rail channel being connected to the rail at the second end and receiving the slideably connected sunroof panel from the rail when the sunroof panel is moving to a closed position; and
a front wall extending in the front-rear direction and including a support arm and a lateral restrictor, wherein
the front wall is adjacent to the rail guide on an interior side of the rail guide,
a first end of the front wall is aligned with the first end of the rail guide adjacent to the front portion of the housing and a second end of the front wall is aligned with the second end of the rail guide adjacent to the rail,
the support arm extends towards the rail guide and below the rail channel at the second end of the rail guide, and
the lateral restrictor has a planar shape parallel to the length of the rail guide, is attached to the support arm, and is in contact with an exterior face of the rail channel at the second end of the rail guide.

2. The assembly of claim 1, wherein
an interior face of the lateral restrictor abuts the exterior face of the rail channel at the second end of the rail guide, wherein the lateral restrictor prevents motion of the rail guide away from the front wall.

3. The assembly of claim 1, wherein
an upper face of the support arm abuts a lower face of the rail channel at the second end of the rail guide, the upper face of the support arm preventing motion of the rail guide in a direction substantially orthogonal to the front-rear direction.

4. The assembly of claim 1, wherein
a front face of the support arm abuts a rear face of the second end of the rail guide, the front face of the support arm preventing motion of the rail guide in a direction towards a rear of the sunroof.

5. The assembly of claim 1, wherein
the first end of the rail guide is coupled to the first end of the front wall.

6. The assembly of claim 1, wherein
the front wall is coupled to the rail guide and the housing.

7. The assembly of claim 1, wherein
the first end of the rail guide includes a first through hole configured to receive a fastener,
the first end of the front wall includes a second through hole substantially aligned with the first through hole, the second through hole configured to receive the fastener, and
the first end of the rail guide is attached to the first end of the front wall via the fastener secured through the first through hole and the second through hole.

8. The assembly of claim 1, wherein the rail guide is between the front wall and the housing.

9. The assembly of claim 1, further comprising:
a spring support; and
a spring end clamp, wherein
the spring support holds a coil of a spring,
the spring end clamp secures an end of the spring,
the spring support is on an exterior side of the front wall, and
the spring end clamp is on an exterior side of the front wall.

10. The assembly of claim 9, wherein the spring support is shaped substantially cylindrical.

11. The assembly of claim 9, wherein
a tip of the spring end clamp is shaped substantially hook-like, the hook deflecting when the end of the spring is inserted towards the spring end clamp, and
the hook-shape prevents egress of the end of the spring in a direction away from the spring end clamp.

* * * * *